United States Patent
Hume et al.

(10) Patent No.: US 6,922,413 B1
(45) Date of Patent: Jul. 26, 2005

(54) METHOD AND APPARATUS TO ENABLE ENHANCED SERVICES OF AN INTELLIGENT TELEPHONE NETWORK IN A WIRELESS ENVIRONMENT

(75) Inventors: Ronald A. Hume, Fort Lauderdale, FL (US); Ossama L. Iskandar, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/401,937

(22) Filed: Sep. 23, 1999

(30) Foreign Application Priority Data

May 17, 1999 (CA) ............................................. 2272020

(51) Int. Cl.⁷ ............................. H04L 12/56; H04J 3/12
(52) U.S. Cl. ....................... 370/410; 370/400; 370/524
(58) Field of Search ................................ 370/524, 400, 370/410

(56) References Cited

U.S. PATENT DOCUMENTS

| | | | | |
|---|---|---|---|---|
| 4,878,240 A | | 10/1989 | Lin et al. ....................... | 379/67 |
| 5,497,424 A | | 3/1996 | Vanderpool ................... | 380/34 |
| 6,141,339 A | * | 10/2000 | Kaplan et al. ............... | 370/352 |
| 6,181,935 B1 | * | 1/2001 | Gossman et al. ........... | 455/433 |
| 6,449,284 B1 | * | 9/2002 | Hagirahim ................... | 370/466 |
| 6,513,061 B1 | * | 1/2003 | Ebata et al. ................. | 709/203 |

FOREIGN PATENT DOCUMENTS

| | | | | |
|---|---|---|---|---|
| JP | 05-260187 | 10/1993 | ............ | H04M/3/46 |
| JP | 07-222219 | 8/1995 | ............ | H04Q/3/58 |
| JP | 08-051477 | 2/1996 | ............ | H04M/3/00 |
| JP | 10-294792 | 11/1998 | ............ | H04M/3/42 |
| WO | 9638009 | 11/1996 | ............ | H04Q/1/10 |
| WO | 9731498 | 8/1997 | ............ | H04Q/7/38 |

OTHER PUBLICATIONS

Kopeikin,R., "Mobilite et Services a Valeur Ajoutee Pour–Les Telecommunications Professionn–elles", Onde Electrique, FR, Editions Chiron S.A. Paris, vol. 72, No. 5, Sep. 1, 1992, pags 16–22.

Haran, D., "Deploying IN Services in a Mobile Environment", Annual Review of Communications, 1997, pp. 1043–1049.

Hlavacek, D.M., et al, "Alternative Methods for Introducing New Wireless Intelligent Network Services Using Triggers and Queries", Bell Labs Technical Journal, US, Bell Laboratories, vol. 2, No. 3, Jun. 21, 1997, pp. 20–29.

* cited by examiner

*Primary Examiner*—Chi Pham
*Assistant Examiner*—Ronald Abelson
(74) *Attorney, Agent, or Firm*—Schmeiser, Olsen & Watts; John R. Pivnichny

(57) ABSTRACT

The subject invention enables enhanced service nodes to interface to wireless intelligent network enabled switch networks in a way the minimizes the cost of network resources while also allowing the wireless intelligent network enabled enhanced services applications to be distributed across multiple geographically dispersed enhanced services nodes. Each of these nodes can have one or more enhanced services applications which can be either or both wireless and wireline enabled. The invention provides a method and apparatus for creating and managing signals in an advanced intelligent telephone network, such as Signaling System 7, resulting from a wireless subscribed in order for the subscriber to access enhanced services.

17 Claims, 9 Drawing Sheets

METHOD AND APPARATUS TO ENABLE ENHANCED SERVICES OF AN INTELLIGENT TELEPHONE NETWORK IN A WIRELESS ENVIRONMENT

FIELD OF THE INVENTION

The subject matter of this invention generally relates to the provision of enhanced services in an intelligent network telephone system. The invention particularly relates to making distributed enhanced services provided by service nodes of such a system available to subscribers of a wireless environment.

BACKGROUND OF THE INVENTION

Over the past number of years the art of telephone networks has significantly evolved past the almost obsolete inband signaling systems where voice and signaling information is carried between network switches on the same medium. Telephone networks known as "intelligent networks" have evolved in which telephone services including signaling and control service functions are performed by independent processors rather than by a local switch or a local switching processor. Common channel signaling and control systems carry large volumes of signaling and control information to support high traffic networks. Such a system is often in the form of a separate network which connects the various network switches to centralized computer systems of significant intelligence and which have access to substantial databases as needed. Through the use of this centralized intelligence supported by synchronized databases, the operations of an entire network can be controlled and its performance enhanced and monitored from end to end. Various intelligent network systems are in use today including Nortel Signaling System 7 (SS7), 1AESS and 5AESS electronic switching systems from AT&T, and Digital Electronic Switching System (EWSD) from Siemens. In such systems the service logic is implemented external to the switches for handling the voice messages and which are interconnected by voice trunks. Such separate service logic also allows for significantly faster call setup and call completion. Such separate service logic allows for database queries and the delivery of a variety of customer calling features such as caller identification or name identification, selective ringing or priority ringing, selective call forwarding, call block or call screen, repeat dialing, call trace and call return. Subscribers today are requesting increased and more complex service offerings referred to generally as "enhanced services" including 1-800 service, 1-900 service, selective call waiting, voice mail/messaging and prepaid service. Such services are handled by the separate service logic network by interconnecting the subscriber with a service node as needed and which is not normally part of the network.

In addition to the wired telephone system, wireless telephone service or cellular service is becoming increasingly popular. Subscribers of these latter services just referenced are also requesting enhanced telephone services in the same way that they are available to wire connected subscribers. Cellular subscribers are able to interconnect with the present day digital intelligent network of the telephone system and such a subscriber can obtain many of the services that a subscriber connected by wire to the telephone network would receive. Many such subscribers also want access to the enhanced services available in intelligent networks. Cellular subscribers could benefit from new services including: prepaid services, prime line (follow-me number), add or remove features on a cellular account, name that number, account balance.

Telephone companies also see the need to be able to provide a greater pool of functional components with which to build applications for subscribers and desire to also offer service bureau type services. In the North American mobility network, the wireless intelligent network is interconnected by the use of signaling protocols referred to an Interim Standard IS41, formally referred to as TIA/EIA-41, based on an ANSI standard. In Europe, the established standard for wireless networks is Global System for Mobile Communications (GSMC). As a result of these protocols, certain functionality problems exist which are inconvenient for subscribers and unattractive to service providers. Such shortcomings may include the requirement for two-stage dialing by a subscriber requiring authentication before a call can be completed. In general, the result of adhering to the signaling protocols for the wireless system prevents the signaling transfer point of a digital switch enabled telephone network to connect enhanced services provided by service nodes of the digital telephone system to a subscriber of a wireless network. Solutions to these and other wireless/wire network problems have not been proposed or implemented prior to the subject invention.

An example of a wireless system for interconnecting to the public telephone network is described in U.S. Pat. No. 5,497,424 entitled "Spread Spectrum Wireless Telephone System" to Jeffrey S. Vanderpool, which issued Mar. 5, 1996. This patent describes arrangements for providing public access by means of cellular telephones to public telephone networks. Mobile persons can have contact with each other and also have access to enhanced features of an intelligent telephone network. By using described communication techniques, user stations can communicate via base stations to private exchange telephone networks as well as public telephone networks.

A reference that provides a general understanding of enhanced services offered by telephone companies is U.S. Pat. No. 4,878,240 entitled "Multi-Service Telephone Switching System", which issued to Steve M. Lin et al on Oct. 31, 1989. This reference describes the use of a programmable adjunct in conjunction with a programmed telephone switch to provide enhanced services at the request of telephone subscribers.

BRIEF DESCRIPTION OF THE INVENTION

The solution proposed in the subject invention enables enhanced service nodes to interface to wireless intelligent network enabled switch networks in a way that minimizes the cost of network resources while also allowing the wireless intelligent network enabled enhanced services application to be distributed across multiple geographically dispersed enhanced services nodes. Each of these nodes can have one or more enhanced services applications which can be either or both wireless and wireline enabled.

As an example of the above proposal that can be implemented by the present teachings, Enhanced Service Node 1 (ESN 1) may be running Application #1, Application #2 and Application #3, while ESN 2 may be running Application #1 and Application #4 and ESN 3 may be running Application #2 and Application #4. Subscriber A may be a subscriber of Application #1 on ESN 1, Application #2 on ESN 3 and Application #4 on ESN 2. Each Subscriber A call will be processed so that Application/Service interaction processing is performed in order to offer the call/transaction to the application that it should go on, and then offer it to the next Application in case the first one determined that there was no action required on its part.

It is an object of the present invention to provide for accessibility of enhanced services to subscribers of wireless intelligent networks that were previously available only to subscribers of a wireline intelligent telephone network.

It is a further object of this invention to provide wireless intelligent network capability to enhanced services.

It is a further object of this invention to provide for a wireless intelligent network interface for a plurality of enhanced service nodes.

It is a further object of this invention to allow wireless intelligent network enabled enhanced services to be distributed across multiple and geographically dispersed service nodes.

It is a further object of the invention to provide for source routing of subscriber trigger data in a wireless intelligent network.

It is a further object of the invention to provide for a subset of nodes to respond to service requests where enhanced services are covered by multiple enhanced service nodes.

It is a further object of the invention to provide for service interaction arbitration where a plurality of enhanced service nodes have a claim on a given subscriber's service request in a wireless intelligent network.

According to one aspect of the invention there is provided in a telephone system, of the common channel signaling and control type having signaling network means for handling switching and control signals separate from voice signals, in which said signaling network means is adapted to respond to and handle calls from wireless subscribers pertaining to requests for services. The signaling network means includes means for providing transaction signals in response to calls to the telephone system by a wireless subscriber requesting service. The signaling network means further including message server means which includes, means for creating message signals, which are compatible with the signaling network means and service nodes, in response to said transaction signals, message router means connected to said means for creating said message signals for routing said message signals to one or more interfaces for service nodes, and means for connecting at least one service node to the message server means in order to convey service provided by the service nodes to said wireless subscriber in response to said subscriber call requesting service.

According to another aspect of the invention there is provided in a telephone system of the common channel signaling and control type having signaling network means for handling switching and control signals separate from voice signals and the signaling network means is adapted to respond to and handle calls from and to wireless subscribers pertaining to requests for services, a method for providing requested services from service nodes to a wireless subscribers. The method comprising the combination of steps of, creating transaction signals by the signaling network means in response to said calls from a wireless subscriber, conveying said transaction signals to a message server means, creating, processing and routing message signals by the message server means in response to said transaction signals, connecting one or more service nodes to the message server means in response to said message signals, and routing responses from one or more service nodes to the signaling network to provide the requested services to the wireless subscriber.

BRIEF DESCRIPTION OF THE DRAWINGS

The present invention is illustrated by way of example only and not by way of limitation, with reference to the accompanying drawings in which:

FIG. 6A is a general flow diagram of messages between SS7 network and Enhanced Service Nodes; FIG. 6B is a flow diagram of messages incoming to the Message Server or MSCP (IWSE); FIG. 6C is a flow diagram of messages outgoing from the MSCP; and FIG. 6D is a flow diagram of messages including an ESN platform logout message flow.

DESCRIPTION OF THE PREFERRED
EMBODIMENTS OF THE INVENTION

Figure 1:
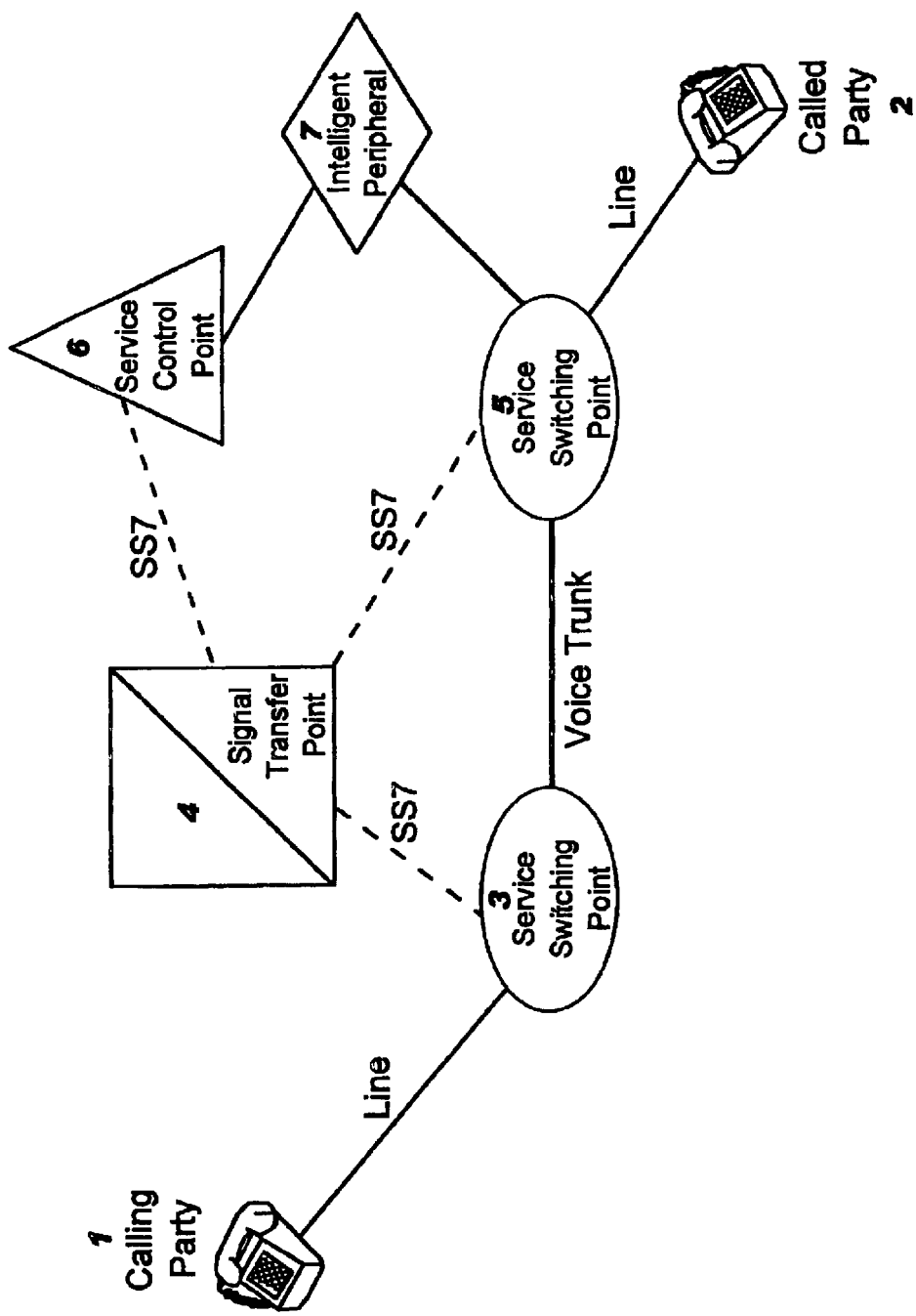
FIG. 1 is a diagram of a general advanced intelligent / network.

In referring to FIG. 1 of the drawings, an overview of an advanced intelligent telephone network will be provided. The terminology and arrangements described in this embodiment will refer to the protocols of the Signaling System 7 (SS7) as an example of a telephone network, but it is understood that the scope of the invention is not limited to such protocols. In an advanced intelligent network, signaling which is used to control and direct subscriber's calls is handled over a different network than that of the actual voice conversation.

Calling party or subscriber 1 places a call to the network in a conventional manner to called party or subscriber 2. The signaling details of the call are handled and directly by Service Switching Point 3, which serves subscriber 1 through the SS7 network to Signal Transfer Point 4 for processing. Depending upon the content of the signaling details, Signal Transfer Point 4 will contact and initiate the necessary resources in the network in order to carry out the functions resulting from the signaling details. In the simplest case, as one feature of the SS7 network protocol, Signal Transfer Point 4 contacts Service Switching Point 5 which serves the called party or subscriber 2 and directs Service Switching Point 5 to establish a connection to the called party 2. If a response is received, for example by called party 2 removing the receiver of the telephone, then a voice connection is established between Service Switching Point 3 servicing calling party 1 and Service Switching Point 5 serving called party 2 to thereby permit a conversation to take place between calling party 1 and called party 2.

In an advanced intelligent network the service logic is carried out external to the actual service switching points, permitting a variety of services to be provided and as may be requested by subscribers. Depending upon the nature of the signaling details, Signal Transfer Point 4 may initiate Service Control Point 6 over other SS7 links to establish other connections in order to provide a variety of services. Service Control Point 6 is programmable and by establishing connections with Intelligent Peripheral 7 a variety of programmable interactive subscriber services can be provided. Access can be achieved by Intelligent Peripheral 7 to permit queries of a variety of databases resulting in subscriber services such as 800 number service and alternate billing services. In effect, direct signaling from Service Switching Point 3 to Intelligent Peripheral 7 results, permitting a variety of new services for subscribers and in effect is the starting point for service nodes and enhanced service offerings.

The description so far has essentially been limited where the subscribers are connected to the network through wired lines. However, the use of new service nodes permits the interconnection of wireless subscribers or cellular subscribers to interface with the wired network.

Figure 2:
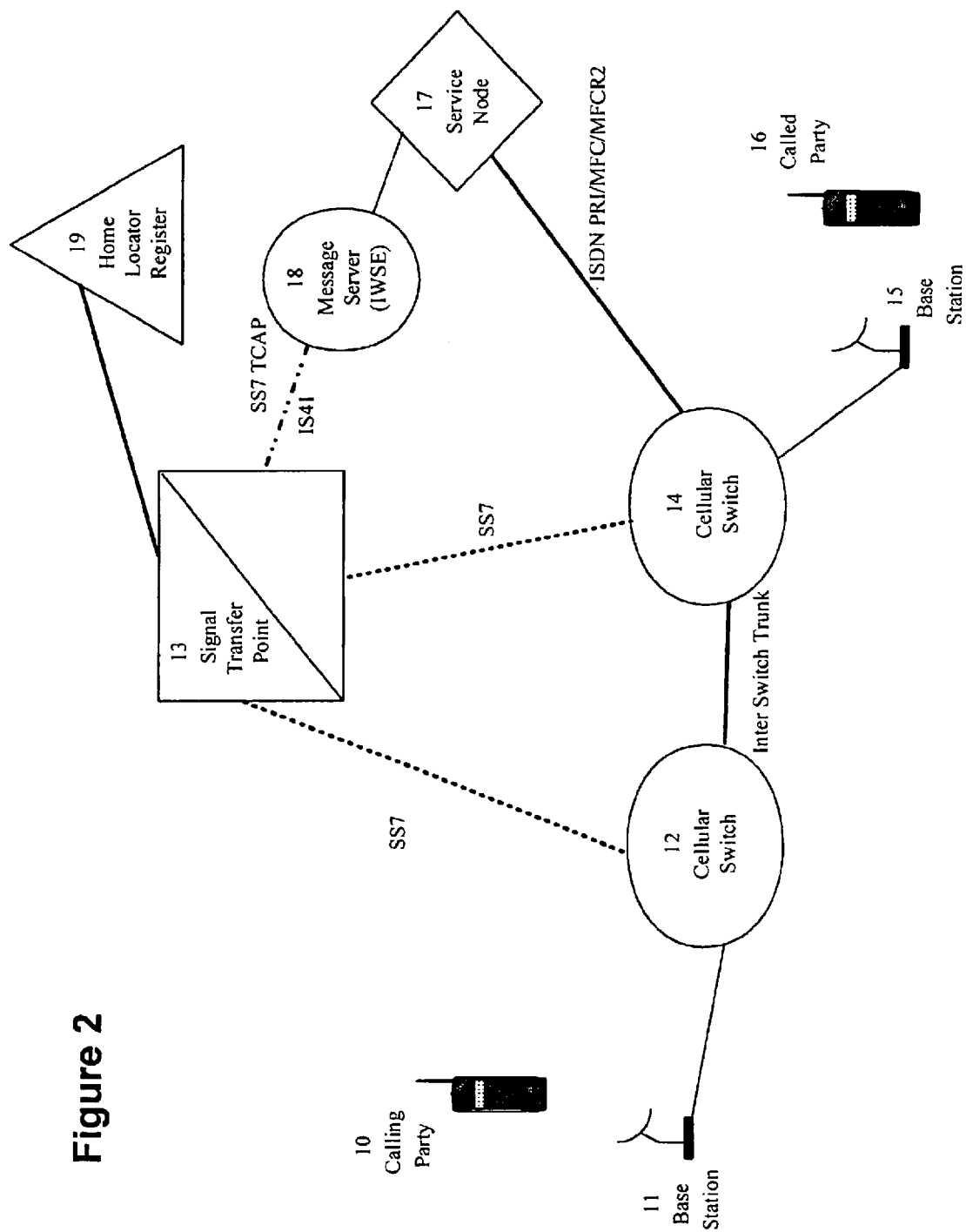
FIG. 2 is a diagram of the architecture of a wireless advanced network in accordance with the invention.

An overview of the architecture for a wireless intelligent network will now be described with reference to FIG. 2 in a similar manner as was provided above for the advanced intelligent network of FIG. 1. Calling party 10 initiates a call in a well known manner to its service base station 11 which in turn is connected to mobility cellular switch centre 12. The Base Stations or Cells provide the radio interface between the cellular phone and the cellular network. Cellular switches are the basic component of a wireless network. These provide the basic connectivity between cellular users and/or cellular users and wireline users. The Signaling System 7 protocol results in the signaling content being handled differently from the voice content. The signaling content is initially processed by Signal Transfer Point 13. As for a conventional simple call to a called party, Signaling System 7 links are connected to cellular switch 14 serving called party 16 to thereby have a connection established with called party 16. Once a response is obtained that called party 16 is able to answer the call, a voice connection is established between cellular switch 12 and cellular switch 14 so as to provide voice communication from calling party 10 to called party 16.

In a Signaling System 7 network the Signaling Transfer Point is responsible for routing the call signaling across the network and directing it to the appropriate network components. The STP also performs a look-ahead function by which it determines the requested terminating line state. If the terminating line is busy or does not answer, the STP instructs the originating cellular switch to provide the caller with a busy tone or a ringing tone respectively. This will occur before establishing a voice path, thus saving voice resources for calls in the talk state.

One protocol that is used for the interconnection of signals in a wireless intelligent network is IS41, as previously mentioned. Within the advanced intelligent network Signaling System 7, Transaction Capabilities Application Part (TCAP) are signal functions that control non-circuit related information transferred between signaling nodes. It is this TCAP signal that is created by SS7 network in response to a call from a wireless network that conventionally cannot be handled directly by Service Nodes 17. It is these service nodes in a wired network that provide the various enhanced services in response to subscriber requests. In an Advanced Intelligent Network environment, enhanced services are delivered through a Service Node. The Service Node delivers the service under the control of triggers delivered from the network. These triggers are delivered using an IS41 message. Message Server 18 is therefore required between the Signal Transfer Point 13 and service nodes generally indicated at 17, in order for a calling/called party in a wireless network to be able to initiate and make use of the services provided at Service Node 17. It is the use of the message server in such a network in the context of FIG. 2 that is the essence of the invention of this application. The invention, in effect, enables enhanced service nodes to use the functionality provided by wireless intelligent network implementations. The IS41 Message Server (IWSE) 18 provides the IS41 interface between the Service Node 17 and the wireless network. It collects the IS41 messages and routes the call to the appropriate Service Node for validation. Also available and connected to Signal Transfer Point 13 is a database Home Locator Register 19 which contains information on the cellular subscribers for a particular service area. When a subscriber is active (cellular phone is turned on) the HLR will identify and validate this cell phone. It also keeps track of the subscriber location at all times.

For illustration purposes, an initial wireless application functionality problem will be presented before further details of the invention are described. A current prepaid service platform requires that a subscriber dial an access number to enter into a voice response system which then gathers billing information and completes the call. This is called "two stage dialing". The mobility service provider may want a caller to always be authenticated every time a cellular phone is used. In addition, it is desirable to remove the two stage dialing process which the service provider regards as cumbersome and intrusive. The functionality resulting from the use of the present invention addresses these problems and also provides the means to develop new applications and services.

Figure 3:
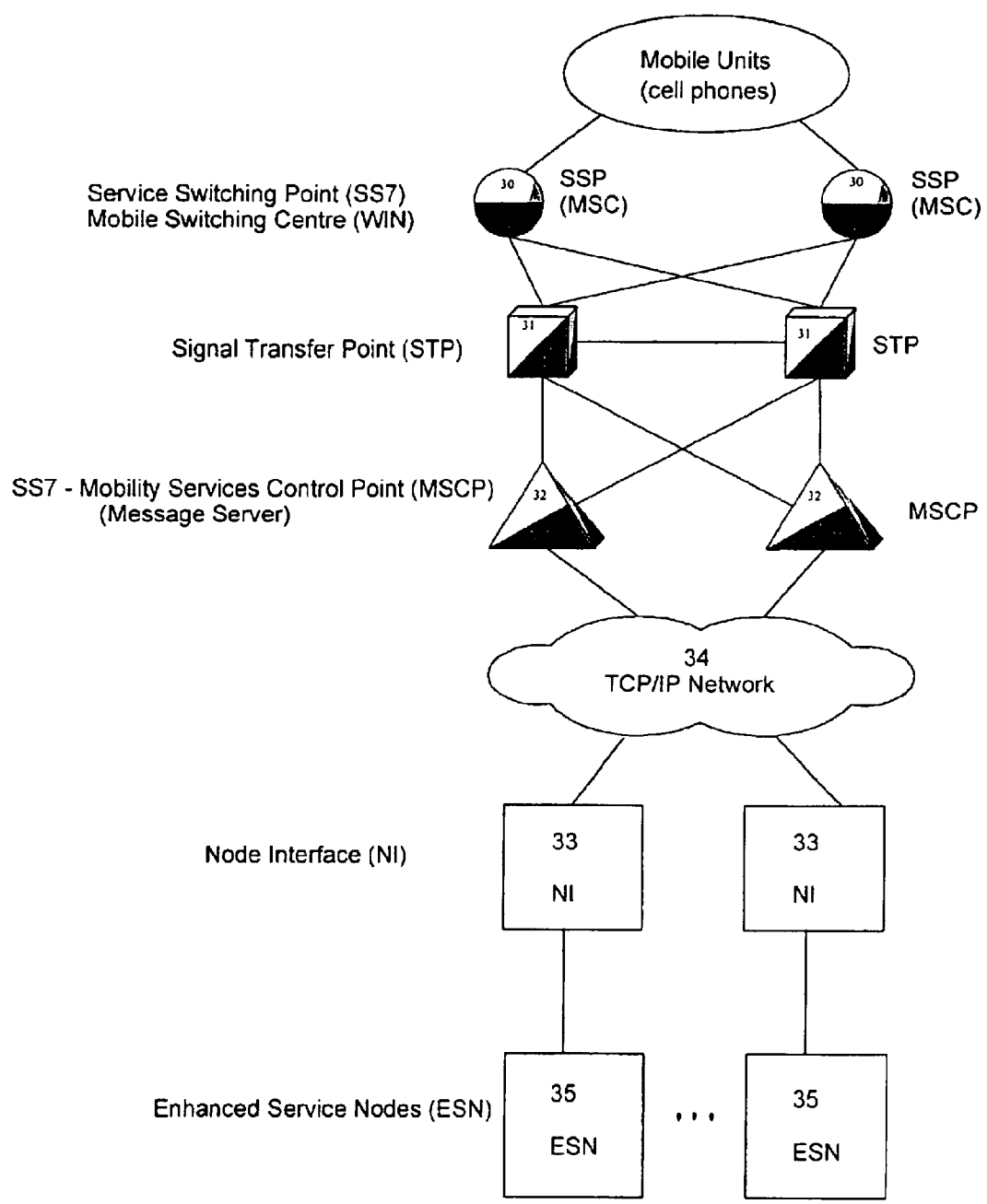
FIG. 3 is a diagram showing how the message server interrelates to other parts of the telephone network.

FIG. 3 is a diagram showing how the Message Server of the subject invention interfaces with other parts of the telephone network. Service Switching Points, or Mobility Switch Centres, are shown by numeral 30. These elements have been previously briefly described with reference to FIGS. 1 and 2 by component reference numbers 3, 5 and 12, 14 respectively, and it is components 30 to which calling parties or called parties are connected whether they are connected by wired lines or use of a cellular telephone. The function provided by Signal Transfer Points 31 is similar to what had been previously described for FIGS. 1 and 2 by component reference numbers 4 and 13 respectively and mainly deal with the processing of signaling details. Message Server 32 functions to connect to the intelligent network, such as Signaling System 7, and performs the functionality of Service Control Point which had been described for component reference 6 as part of FIG. 1. Message Server 32 integrates into the existing telephone network and consists of two components, namely the Mobility Services Control Point (MSCP) 32 and the Node Interface (NI) 33. On the one hand, Message Server connects to the telephone network via Signal Transfer Points 31. On the other hand, Message Servers 32 communicate with Node Interfaces 33 and Enhanced Service Nodes 35, using a communication protocol such as Internet and Network Protocol Transfer Control Protocol/Internet Protocol (TCP/IP), although other protocols may be used. Together, the Mobility Services Control Point and the Node Interface of the Message Server route Transaction Capabilities Application Part (TCAP) messages from the SS7 link between the telephone network and the appropriate application running on the Enhanced Service Node 35.

FIG. 3 is a diagram for illustrative purposes only and of course in reality and in an actual network application, there may be more or fewer or the various components in the network than are shown in FIG. 3. The applicant of the subject patent application makes available an actual product to implement Message Server which is formally known as the IBM Wireless Services Enabler.

In addition to the Message Server consisting of the Mobility Services Control Point and the Node Interface, a platform-node interface (PNI) provides a coding interface for the various platforms providing the enhanced services to communicate with the node interface. This application program interface is essentially a remote procedure call (RPC) library that is used by the platform to interface with the node interface, as is well known. An RPC.x file is used to produce the PNI client/server module for communication between the node interface and the services on the platform. The RPC.x file is the protocol definition file, and as would be appreciated by those skilled in the art, is used to define the required communication protocol.

Figure 4:
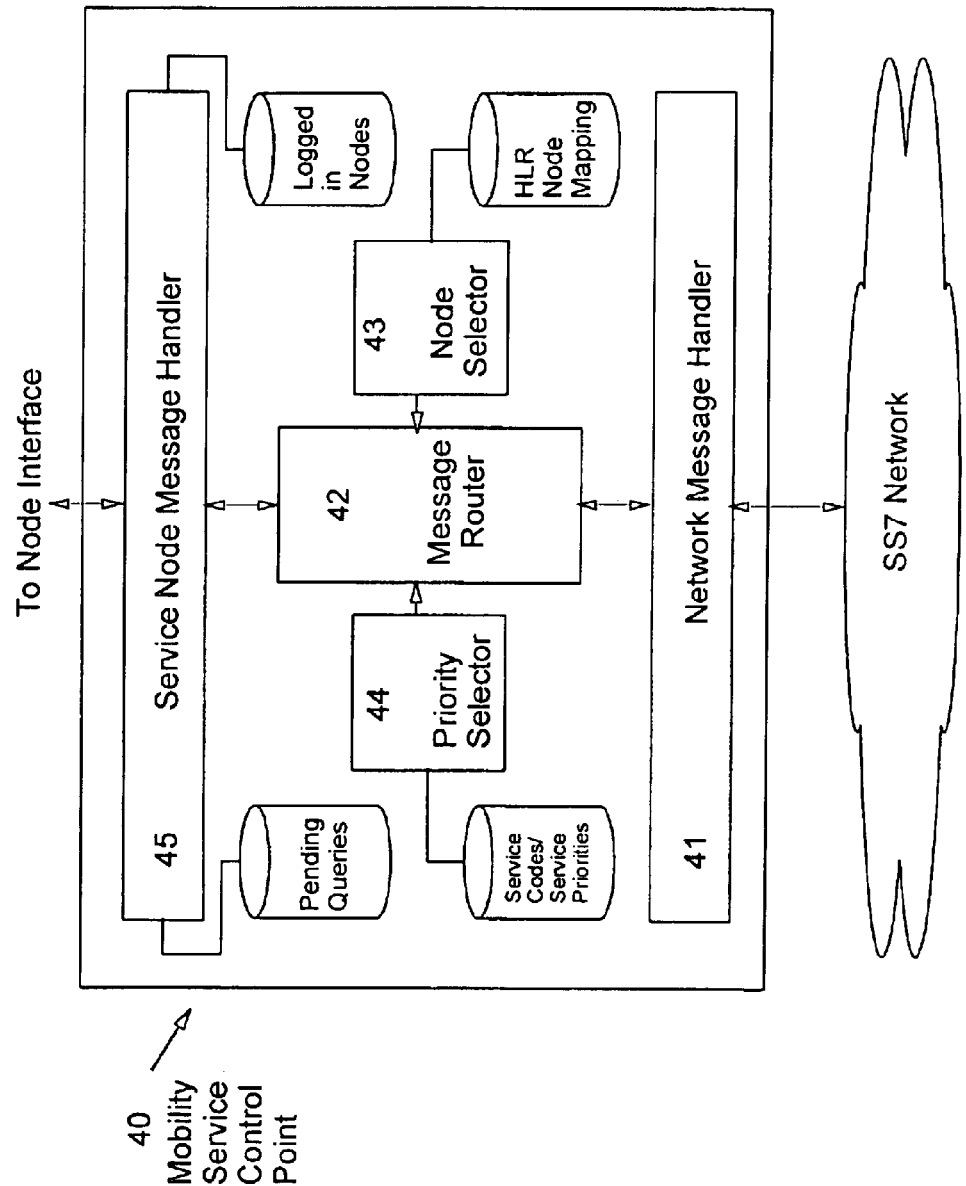
FIG. 4 is a diagram of the software architecture of the Mobility Service Control Point for the processing of messages, according to the invention.

Turning now to FIG. 4, a functional description of the most significant aspects of the software architecture to implement the Mobility Service Control Point will now be provided. Mobility Service Control Point is generally represented by the element numbered 40 in FIG. 4 and is shown connected to the intelligent network telephone system (SS7) and the Node Interface. The MSCP is designed to act as a bridge for the TCAP messages to pass between the telephone network and the enhanced service nodes or the mobility service providers.

MSCP 40 consists of five main functional components, namely Network Message Handler 41, Message Router 42, Node Selector 43, Priority Selector 44 and Service Node Message Handler 45. Network Message Handler 41 sends and receives TCAP transactions from the intelligent telephone network SS7. It does this by packing and unpacking the TCAP signal components and passing this information to the Message Router 42. Message router 42 has two functions. The first is to send and receive messages to and from the node interfaces at the enhanced service nodes or mobility service platforms. It also prioritizes services competing for the same transaction and thus implements results of service interaction arbitration and prioritization performed by Priority Selector 44 as will be described.

Node Selector 43 provides the function of choosing which node or nodes will handle a request originating from the network. Node Selector 43 provides source routing capability for routing Wireless Intelligent Network (WIN) data initiated by a subscriber call to target Enhanced Services Nodes (ESN) based on the subscriber's originating Home Locator Register point code in the SS7 system. Source routing allow subscribers to be grouped in the same way that the SS7 network groups them. If the same service is offered in multiple geographical/logical areas by telephone companies, the correct ESN can be selected to serve the subscriber based on the Home Locator Register's network address. Current systems typically route requests based on called or calling subscriber number, or select an ESN to serve the customer which then has to query a central database for the subscriber's information (i.e. the subscriber doesn't have a "home" node).

In a given geography, telephone companies may provide enhanced service coverage by multiple ESNs, each of which may have multiple enhanced services to offer. A subset of these may each have a claim on the processing of a given request for service. It is more efficient to have the system poll only a reduced number of nodes as opposed to polling all of them. A node reduction algorithm reduces the total set of nodes which offer service in the network, to a subset of nodes which serve the subscriber's geographical/logical telephone company area for services for which the subscriber is a subscriber. Thus, the node reduction algorithm results in the selection of a subset of ESNs to offer the requested service transaction based on the subscriber's originating home location register point code in the SS7. This algorithm provides "many to many" data relationships between Node Addresses and the Home Locator Register (HLR) address. The algorithm inspects the incoming message for the HLR point code and checks the logged-in nodes for the nodes served by this HLR. Once this subset of nodes is identified, these are the only ones polled. Priority Selector 44 provides the functions of performing arbitration and prioritization among the various ESNs that respond to a request from the network in order to determine which service and which ESN will handle the call. One or more ESNs may offer one or more services, each of which have a claim on the processing of a given subscriber's request for service. Examples of such services include a prepaid cellular application or a calling party pays application. A cross node service interaction arbitration algorithm selects the services, in service provider specified order, to be offered the transaction for processing. Multiple enhanced services are thereby enabled to share one SS7 network interface while at the same time providing the technical advantages of cross node service arbitration. The need for each ESN to have an SS7 interface is thus removed.

Service Node Message Handler 45 manages and provides reliable communication to and from the node interfaces.

Message Network Handler 41 communicates with the SS7 network over SS7 adapters. These adapters are hardware components which are part of the system on which the Message Server (IWSE) software operates. There is a minimum of two adapters on each system, one adapter is active while the other adapter is on standby.

Various storage devices are shown in FIG. 4 for providing the appropriate databases for the respective components. Thus it can be seen from the combination of the above described functional elements that the Mobility Service Control Point performs the functions of sending and receiving TCAP messages which have been created by the Signaling System 7 telephone network as a result to a call to/from a subscriber. The MSCP then reliably delivers and routes the TCAP messages to the appropriate Node Interface and manages the service interactions between the different enhanced services which may be available on one or more enhanced service nodes.

As had been indicated, another part of the Message Server is the Node Interface. The software architecture of the Node Interface will now be described with reference to FIG. 5. The Node Interface is generally shown by reference 51 in FIG. 5 and functions as an interface between the MSCP 40 described in FIG. 4 and the platform node interfaces, which have been previously referred to, and ultimately to the Enhanced Service Nodes or the mobile service providers. Node Interface 51 performs a number of functions. It sends incoming messages from the network to the correct application and the correct Enhanced Service Node which provides the required service via Platform Interface 52 and routes outgoing messages to the MSCP previously described via the MSCP Interface 52. Node Interface 51 maintains a list of logged in applications provided by Enhanced Service Nodes as shown at 54. Further, Node Interface 51 informs individual service nodes of incoming transactions from subscribers which are stored at 56 Pending Queries. Transaction information is stored at Transaction Information Manager 55 for later retrieval by the application that is selected to receive the service. Store 55 is connected to TLDN Indexed IS41 Info 57 which stores the Temporary Line Directory Number and the respective IS41 protocol message information. The Temporary Line Directory Number (TLDN) database holds the numbers that are temporarily assigned to identify applications in the Services Nodes and these are provided to Transaction information is stored at Transaction Information Manager 55 as needed. Lastly, the Node Interface 51 assembles the responses from the applications provided by the Enhanced Service Nodes in order to construct service lists for delivery to the MSCP for service interaction arbitration, as previously described. The information on each of the SS7 adapters and which adapter is maintained in Storage MSCP Adapter List/Active Adapter 58, as the Interface needs to know which adapter is active. MSCP Interface 53 maintains the connection to the Mobility Services Control Point as previously described. Platform Interface 52 maintains the connection to the various platforms of the ESNs, handles heartbeating and coordinates requests for service lists.

A description will now be provided with reference to FIGS. 6A to 6D of the drawings of various call flow messages resulting from incoming calls to the Message Server originating from cellular subscribers relating to the provision of services by applications in the Enhanced Service Nodes. As has been previously described, the Message Server includes the functions of the Mobility Services Control Point and Node Interfaces.

Figure 6A:
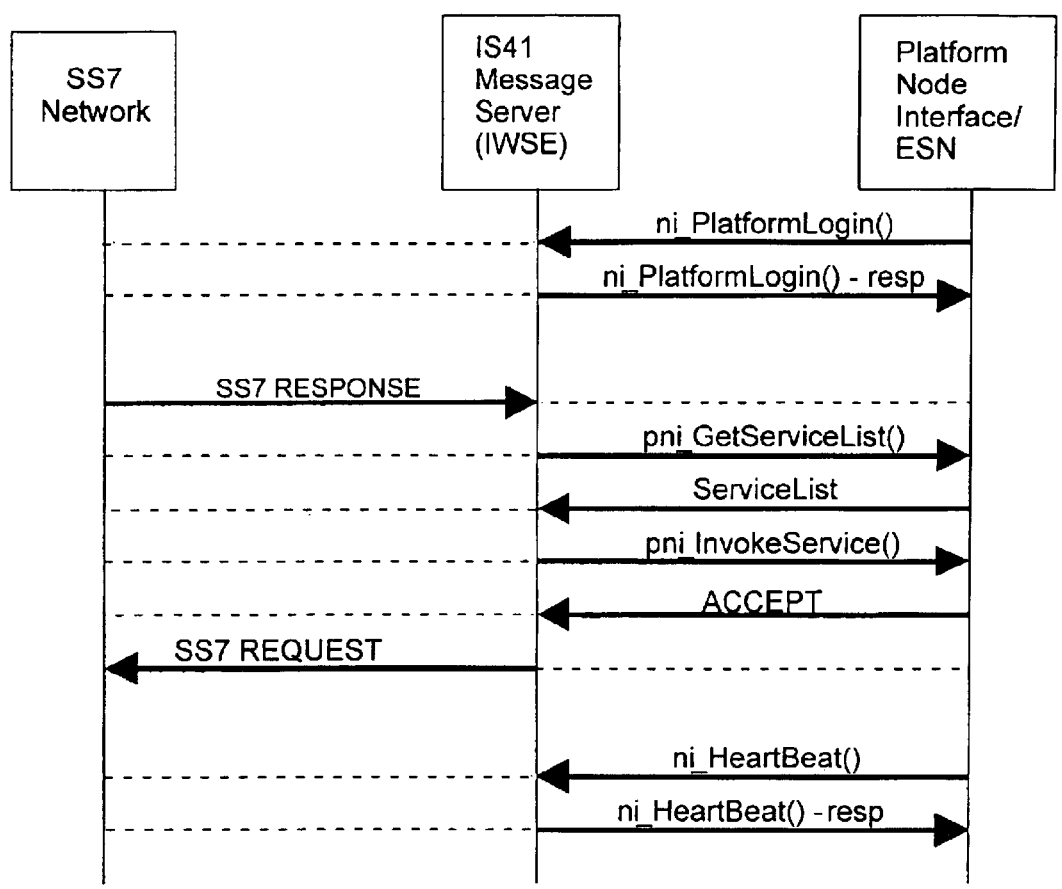
FIGS. 6A to 6D are diagrams showing the call flows relevant to the functioning of the Mobility Service Control Point and the Node Interface where

FIG. 6A shows the message flow between the SS7 network, the Message Server (IWSE) and the Platform Node Interfaces/Enhanced Service Nodes. This diagram shows the interactions of the messages external to the actual Message Server. FIG. 6A illustrates a typical or general log-in/log-out sequence which each ESN performs. The sequence notifies the IWSE that the ESN is active and is offering service. The message ni_PlatformLogin( ) is generated by an ESN to login ont9o the IWSE to identify itself as active. The message ni_PlatformLogin( )-resp is the acknowledgment from the IWSE in response to the ni_PlatformLogin( ) message. This Figure also provides for a typical request/response pair of messages for heartbeating. These are illustrated as messages ni_HeartBeat and ni_Heartbeat-resp. These messages flow between the ESN and the IWSE periodically in order to ensure that connections are still active. ni_HeartBeat( ) is a timed message, for example, every 30 seconds, originated by the platform (ESN) to inform the IWSE that it is active and well. The message ni_HeartBeat( )-resp is the IWSE acknowledgment that the heartbeat message has been received. The messages SS7 Response and SS7 Request illustrate communications between the SS7 Network and the Message Server. Of particular significance, FIG. 6A shows the messages from the Node Interface for GetServiceList and InvokeService which will be described in more detail subsequently with reference to FIG. 6B.

Figure 6B:
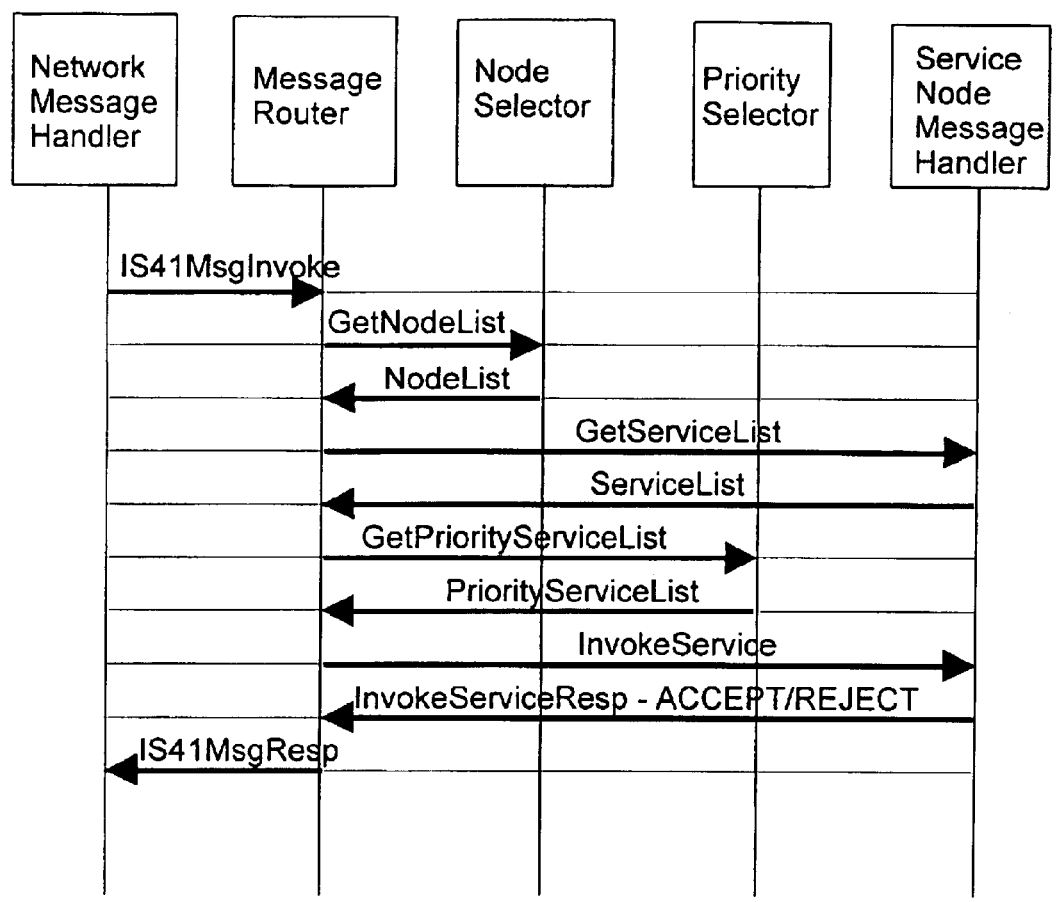

With reference to FIG. 6B, the flow of messages is illustrated inside the Mobility Service Control Point and which occur when a request for service arrives from the network. Since this Figure deals with the various messages that flow within the Mobility Service Control Point of the Message Server, the various component names shown in FIG. 6B have the meaning as previously indicated and described with reference to FIG. 4.

The Network Message Handler decodes the SS7 TCAP message into an internal Message Server format shown as IS41 MsgInvoke. It then forwards the message to the Message Router for processing. The Message Router sends a GetNodeList message to the Node Selector. Node Selector performs a node reduction algorithm, as previously described, and returns a list of nodes to which the processing of the transaction should be offered, referred to as NodeList in FIG. 6B. The Message Router then sends a GetServiceList message to the Service Node Message Handler which forwards it on through the Node Interface ultimately to the appropriate Enhanced Service Node. The Service Node Message Handler then gathers up the responses from the Node Interfaces and compiles a ServiceList. This, of course, is a list of services which are capable of handling the transactions and for which the subscriber is a customer. It has previously been confirmed that the service knows about the existence of the subscriber. This ServiceList is then sent back to the Message Router as shown in FIG. 6B. The Message Router sends the ServiceList to the Priority Selector using the GetPriorityServiceList message as shown. The Priority Selector ranks the services in the list in order of priority as defined by the service providers in order to handle the appropriate service interaction. The sorted list is returned to the Message Router in a message labeled PriorityServiceList as shown in FIG. 6B. The Message Router then sends the transaction to the Service Node Message Handler using the InvokeService message as shown, which forwards it on through the Node Interface of the selected node and ultimately to the Enhanced Service Node which was selected as high priority. The result then comes back from the Enhanced Service Node through the Service Node Message Handler to the Message Router which forwards a IS41 MsgResp to the Network Message Handler for coding the response into a TCAP message for the network.

A response from the Node Interface and the Service Node Message Handler can be in one of three forms. An AcceptService response is essentially a positive response to the network with the required information filled in order to further process the call, which could be for example, a Temporary Line Directory Number (TLDN). An AcceptService message essentially means that the caller is authorized to use the particular service. A RejectService is a response indicating that the service to which the transaction was offered has processed the transaction and a response should be sent to the network indicating a negative result, for example "do not process any further", or "system overloaded". In effect, a reject message means the caller is not authorized to use the service. ReSelect is a response indicating that the transaction should be passed on to the next service in the priority list. In this process, if the last service in the list issues a ReSelect response, then a RejectService message is sent to the network and the call is terminated. In each case pertaining to the above three response forms, the Message Router sends an appropriate response to the Network Message Handler. The Network Message Handler encodes the response in network format and sends it back to the originating telephone network system.

An Outgoing Call is defined as a call originated by a cellular subscriber. When a cellular subscriber goes off-hook the Signal Transfer Point eventually queries the Home Locator Register which recognizes the subscriber as an Advanced Intelligent Network subscriber and routes the messages to the Message Server for functioning of the IWSE.

An Incoming Call is defined as a call incoming to a cellular subscriber. When a call is destined to a cellular subscriber the Home Locator Register, via the Signal Transfer Point, recognizes the subscriber as an Advanced Intelligent Network subscriber and routes the messages to the Message Server and the IWSE.

Figure 6C:
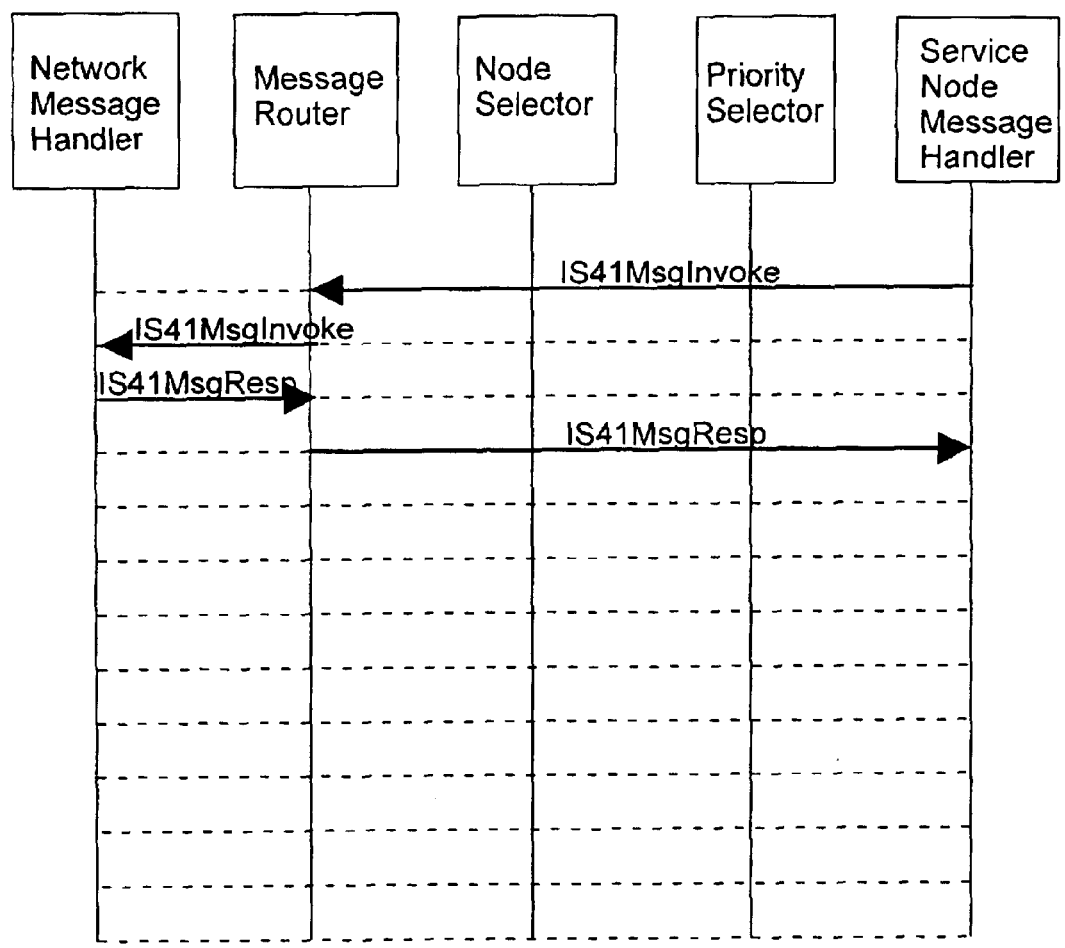

FIG. 6C shows the detailed transaction flows within the IWSE of the Message Server, Any application of a Node Interface and an Enhanced Service Node connected to the IWSE can originate an IS41 transaction as shown in this Figure. In effect, this Figure shows the scenario that occurs when an ESN initiates a network transaction. The Service Node Message Handler receives the transaction from the Node Interface and the ESN. The Service Node Message Handler sends an IS41 MsgInvoke to the Message Router. The Message Router sends this IS41 MsgInvoke to the Network Message Handler for encoding. The Network Message Handler encodes the message as a TCAP message and sends the request to the network. The Network Message Handler receives the response from the network, decodes it and sends the IS41 MsgResp to the Message Router. The Message Router sends the IS41 MsgResp response to the Service Node Message Handler for forwarding the response on to the requesting Node Interface/Enhanced Service Node.

Figure 5:
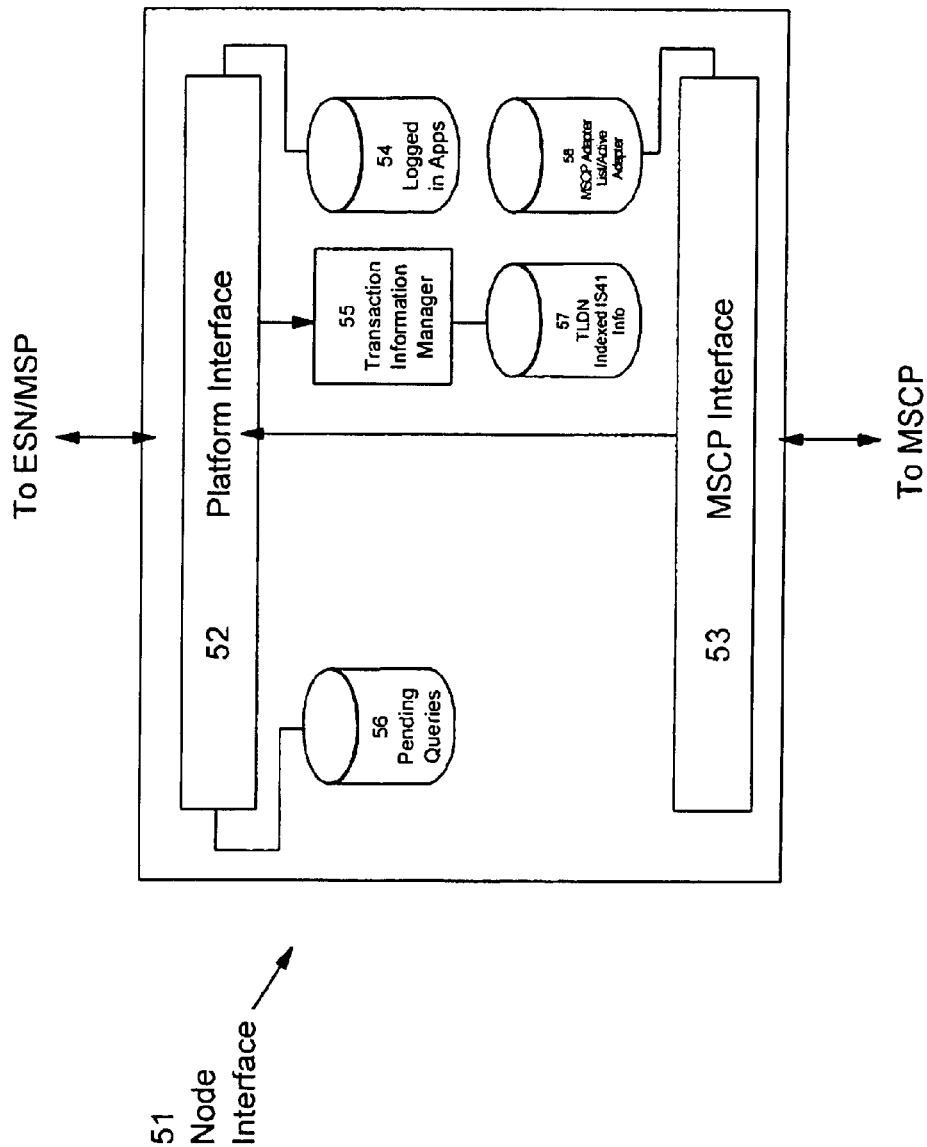
FIG. 5 is a diagram of the software architecture of the node interface according to the invention.
Figure 6D:
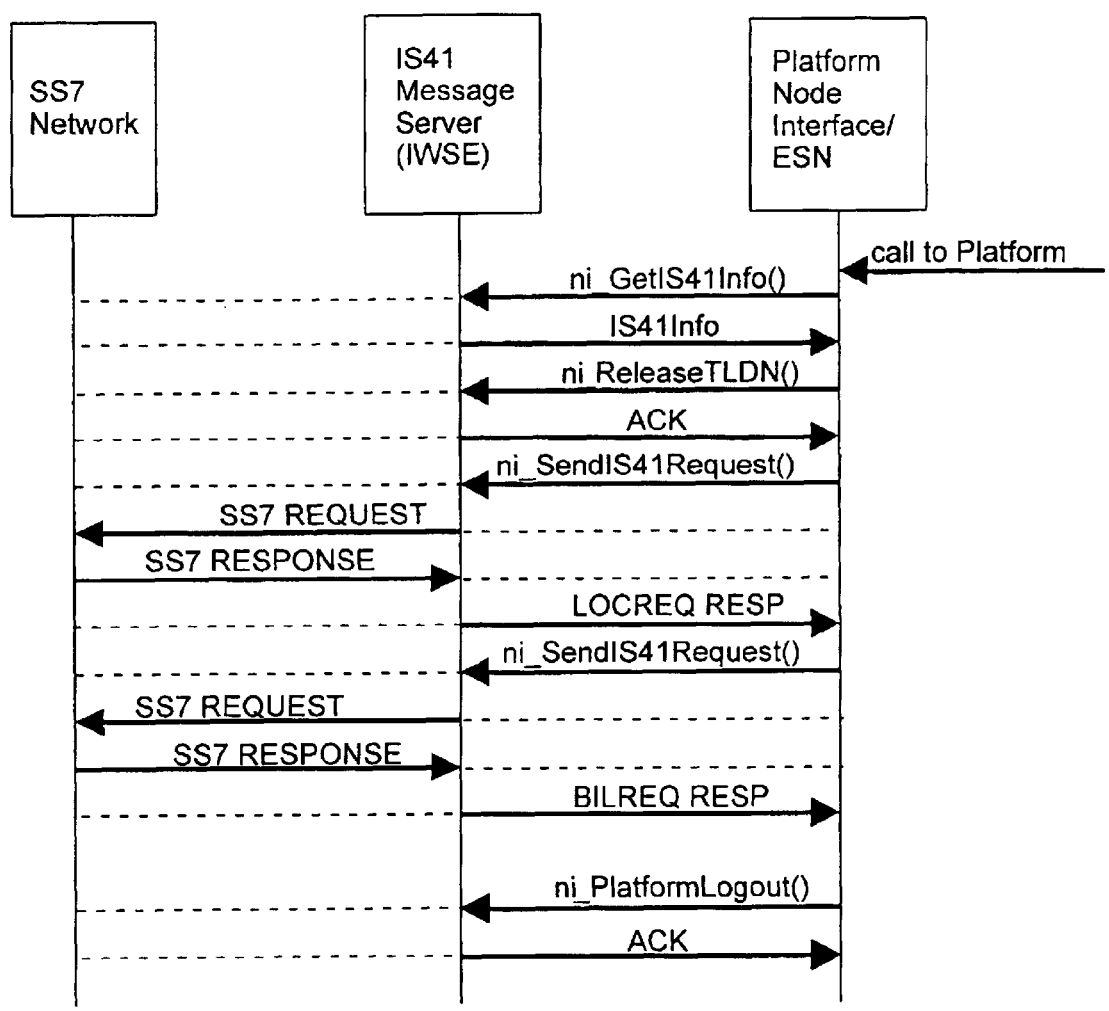

FIG. 6D shows another set of interactions external to the actual Message Server. The latter messages shown pertain to a platform logout message flow which indicates that the Enhanced Service Node platform is no longer actively offering service. A Platform Logout message is sent to the Message Server and a Ack message is returned. FIG. 6D shows the GetIS41Info and ReleaseTLDN (Temporary Line Directory Number) message flows. These messages are used to allow the Enhanced Service Node access to the Node Interface's Transaction Information Manager database, as referred to in FIG. 5. The GetIS41Info query causes the Node Interface to look up the requested transaction details and supply them to the Enhanced Service Node as shown by message IS41Info. The ReleaseTLDN message causes the Node Interface to delete the specified records from its database and when this action is completed an Ack message response is provided to the ESN. The first SS7 Response message shown is the extension of the ni_SendIS41Request which originated from the platform, from the Message Server to the network, which passes through the IWSE to the network in an SS7 format. The response SS7 Response and the requested information in LOCREQ RESP is returned to the platform. Similarly, the second SS7 Request message is the extension of another request from a platform with information returned in the message BILREQ RESP. This Figure shows a higher level view of the message flow as described in FIG. 6C.

It will be understood that essentially each of the blocks illustrated and described in FIGS. 3, 4 and 5 and the creation and flow of the various messages shown and described in FIGS. 6A to 6D can be implemented by computer program instructions. These program instructions may be provided to a processor to produce a machine, such that the instructions which execute on the processor create means for implementing the functions specified in the various blocks and messages and are needed to support the messages. The computer program instructions may be executed by a processor to cause a series of operational steps to be performed by the processor to produce a computer implemented process such that the instructions that execute on the processor provide steps for implementing the instructions specified in and required by the various blocks and messages.

Accordingly, the various illustrated and described blocks and messages support combinations of means for performing the specified functions, combinations of steps for performing the specified functions, and program instruction means for performing the specified functions. It will also be understood that each block or combinations of blocks in the various drawings and the creation and flow of the various messages can be implemented by special purpose hardware based systems which perform the specified functions or steps or combinations of special purpose hardware or computer instructions.

Preferred embodiments of the present invention have been described hereinabove by way of example only and not of limitation such that those skilled in the art will readily appreciate that numerous modifications of detail and application may be made to the present invention, all coming within its spirit and scope.

What is claimed is:

1. In a telephone system of the common channel signaling and control type having signaling network means for handling switching and control signals separate from voice signal, said signaling network means adapted to respond to and handle calls from wireless subscribers pertaining to requests for services, said signaling network means including means for providing transaction signals in response to calls to the telephone system by a wireless subscriber requesting service, said signaling network means further including message server means which includes:

means for creating message signals, which are compatible with the signaling network means and service nodes, in response to said transaction signals, said means for creating message signals not being comprised by a service node of the network;

message router means connected to said means for creating said message signals for routing said message signals to said service nodes;

means for selecting a subset of the service nodes of the network through execution of a node reduction algorithm in response to a request for service by a subscriber of the wireless subscribers, said subset of the service nodes being limited to only those service nodes of the network which serve the subscriber's geographical area or logical telephone company area for services which the subscriber has subscribed to;

means for selecting at least one service node of the subset of the service nodes to process said message signals by performing arbitration and prioritization among the nodes of the subset of service nodes in order to provide service responsive to the subscriber's request for service; and node interface means for connecting the at least one service node to the message server means in order to provide service responsive to the subscriber's request for service, said node interface means adapted to assemble responses from applications provided by the service nodes, said node interface means further adapted to use said assembled responses to construct service lists for delivery to the message service means for performing said arbitration.

2. In a telephone system of the common channel signaling and control type having signaling network means for handling switching and control signals separate from voice signal, said signaling network means adapted to respond to and handle calls from wireless subscribers pertaining to requests for services, said signaling network means including means for providing transaction signals in response to calls to the telephone system by a wireless subscriber requesting service, said signaling network means further including message server means which includes:

means for creating message signals, which are compatible with the signaling network means and service nodes, in response to said transaction signals;

message router means connected to said means for creating said message signals for routing said message signals to one or more interfaces for service nodes;

means for selecting at least one service nodes to process message signals by performing arbitration and prioritization among the various service nodes of the network in order to provide requested services to the wireless subscribers;

means for connecting at least one service node to the message service means in order to convey service provided by the service nodes to said wireless subscriber in response to said subscriber call requesting service, wherein said message server means includes node selector means for routing message signals to service nodes based on the nature of the service requested by the wireless subscriber and the location of the wireless subscriber originating the requesting call and said signaling network means further includes means for validating the wireless subscriber; and means for assembling responses from applications provided by the service nodes and for using said assembled responses to construct service lists for delivery to the message service means for performing said arbitration.

3. In a telephone system of the common channel signaling and control type having signaling network means for handling switching and control signals separate from voice signals, said signaling network means adapted to respond to and handle calls from and to wireless subscribers pertaining to requests for services, a method for providing requested services from service nodes to wireless subscribers comprising the steps of:

creating transaction signals by the signaling network means in response to calls from wireless subscribers;

conveying said transaction signals to a message server means;

creating, processing and routing message signals by the message server means in response to said transaction signals, including:

selecting a subset of the service nodes of the network through execution of a node reduction algorithm in response to a request for service by a subscriber of the wireless subscribers, said subset of the service nodes being limited to only those service nodes of the network which serve the subscriber's logical telephone company area for services which the subscriber has subscribed to, said logical telephone company area not being defined in terms of a logical criterion that includes the subscriber's geographical area; and selecting at least one service node of the subset of the service nodes by performing arbitration and prioritization among nodes of the subset of service nodes in order to provide service responsive to the subscriber's request for service, said creating the message signals not being performed by a service node of the network;

connecting the at least one service node to the message server means in order for the at least one service node to provide said service responsive to the subscriber's request for service; and routing responses from said at least one service node to the signaling network to provide the service requested by the subscriber of the wireless subscribers, wherein said step of creating, processing and routing said message signals includes:

sending and receiving said transaction signals to and from the signaling network and the message server means;

sending and receiving said message signals resulting from the transaction signals to and from an interface to the service nodes;

selecting a node interface from a plurality of node interfaces, said node interfaces connecting said message server means to said service nodes; and communicating said message signals to and from the node interface.

4. The telephone system according to claim 1, said message server means further comprising service node message handler means for connecting said message router means to said node interface means, said service node message handler means being coupled to a database of pending queries, said pending queries being associated with incoming transactions from said wireless subscribers, said database of pending queries being comprised by said message server means.

5. The telephone system according to claim 1, said message server means further comprising service node message handler means for connecting said message router means to said node interface means, said service node message handler means being coupled to a database of logged in nodes of the service nodes, said of database of logged in nodes being comprised by said message server means.

6. The telephone system according to claim 1, said node interface means comprising a list of logged in applications provided by the service nodes.

7. The telephone system according to claim 1, said node interface means comprising a transaction information manager at which transaction information is stored for later retrieval by an application of the selected at least one service node.

8. In a telephone system of the common channel signaling and control type having signaling network means for handling switching and control signals separate from voice signals, said signaling network means adapted to respond to and handle calls from and to wireless subscribers pertaining to requests for services, a method for providing requested services from service nodes to wireless subscribers comprising the steps of:

creating transaction signals by the signaling network means in response to calls from wireless subscribers;

conveying said transaction signals to a message server means;

creating, processing and routing message signals by the message server means in response to said transaction signals, including:

selecting a subset of the service nodes of the network through execution of a node reduction algorithm in response to a request for service by a subscriber of the wireless subscribers, said subset of the service nodes being limited to only those service nodes of the network which serve the subscriber's logical telephone company area for services which the subscriber has subscribed to, said logical telephone company area not being defined in terms of a logical criterion that includes the subscriber's geographical area; and selecting at least one service node of the subset of the service nodes by performing arbitration and prioritization among nodes of the subset of service nodes in order to provide service responsive to the subscriber's request for service, said creating the message signals not being performed by a service node of the network;

connecting the at least one service node to the message server means in order for the at least one service node to provide said service responsive to the subscriber's request for service; and routing responses from said at least one service node to the signaling network to provide the service requested by the subscriber of the wireless subscribers, said message server means comprising service node message handler means coupled to the at least one service node, said method further comprising coupling the service node message handler means to a database of pending queries, said pending queries being associated with incoming transactions from said wireless subscribers, said database of pending queries being comprised by said message server means.

9. In a telephone system of the common channel signaling and control type having signaling network means for handling switching and control signals separate from voice signals, said signaling network means adapted to respond to and handle calls from and to wireless subscribers pertaining to requests for services, a method for providing requested services from service nodes to wireless subscribers comprising the steps of:

creating transaction signals by the signaling network means in response to calls from wireless subscribers;

conveying said transaction signals to a message server means;

creating, processing and routing message signals by the message server means in response to said transaction signals, including:

selecting a subset of the service nodes of the network through execution of a node reduction algorithm in response to a request for service by a subscriber of the wireless subscribers, said subset of the service nodes being limited to only those service nodes of the network which serve the subscriber's logical telephone company area for services which the subscriber has subscribed to, said logical telephone company area not being defined in terms of a logical criterion that includes the subscriber's geographical area; and selecting at least one service node of the subset of the service nodes by performing arbitration and prioritization among nodes of the subset of service nodes in order to provide service responsive to the subscriber's request for service, said creating the message signals not being performed by a service node of the network;

connecting the at least one service node to the message server means in order for the at least one service node to provide said service responsive to the subscriber's request for service; and routing responses from said at least one service node to the signaling network to provide the service requested by the subscriber of the wireless subscribers, said message server means comprising service node message handler means coupled to the at least one service node, said method further comprising coupling the service node message handler means to a database of logged in nodes of the service nodes, said database of logged in nodes being comprised by said message server means.

10. In a telephone system of the common channel signaling and control type having signaling network means for handling switching and control signals separate from voice signals, said signaling network means adapted to respond to and handle calls from and to wireless subscribers pertaining to requests for services, a method for providing requested services from service nodes to wireless subscribers comprising the steps of:

creating transaction signals by the signaling network means in response to calls from wireless subscribers;

conveying said transaction signals to a message server means;

creating, processing and routing message signals by the message server means in response to said transaction signals, including:

selecting a subset of the service nodes of the network through execution of a node reduction algorithm in response to a request for service by a subscriber of the wireless subscribers, said subset of the service nodes being limited to only those service nodes of the network which serve the subscriber's logical telephone company area for services which the subscriber has subscribed to, said logical telephone company area not being defined in terms of a logical criterion that includes the subscriber's geographical area; and selecting at least one service node of the subset of the service nodes by performing arbitration and prioritization among nodes of the subset of service nodes in order to provide service responsive to the subscriber's request for service, said creating the message signals not being performed by a service node of the network;

connecting the at least one service node to the message server means in order for the at least one service node to provide said service responsive to the subscriber's request for service; and routing responses from said at least one service node to the signaling network to provide the service requested by the subscriber of the wireless subscribers, said method further comprising providing node interface means connecting the service nodes to the message server means, said node interface means including a list of logged in applications provided by the service nodes.

11. In a telephone system of the common channel signaling and control type having signaling network means for handling switching and control signals separate from voice signals, said signaling network means adapted to respond to and handle calls from and to wireless subscribers pertaining to requests for services, a method for providing requested services from service nodes to wireless subscribers comprising the steps of:

creating transaction signals by the signaling network means in response to calls from wireless subscribers;

conveying said transaction signals to a message server means;

creating, processing and routing message signals by the message server means in response to said transaction signals, including:

selecting a subset of the service nodes of the network through execution of a node reduction algorithm in response to a request for service by a subscriber of the wireless subscribers, said subset of the service nodes being limited to only those service nodes of the network which serve the subscriber's logical telephone company area for services which the subscriber has subscribed to, said logical telephone company area not being defined in terms of a logical criterion that includes the subscriber's geographical area; and selecting at least one service node of the subset of the service nodes by performing arbitration and prioritization among nodes of the subset of service nodes in order to provide service responsive to the subscriber's request for service, said creating the message signals not being performed by a service node of the network;

connecting the at least one service node to the message server means in order for the at least one service node to provide said service responsive to the subscriber's request for service; and routing responses from said at least one service node to the signaling network to provide the service requested by the subscriber of the wireless subscribers, said method further comprising providing node interface means connecting the service nodes to the message server means, said node interface means including a transaction information manager at which transaction information is stored for later retrieval by an application of the selected at least one service node.

12. In a telephone system of the common channel signaling and control type having signaling network means for handling switching and control signals separate from voice signals, said signaling network means adapted to respond to and handle calls from and to wireless subscribers pertaining to requests for services, a method for providing requested services from service nodes to wireless subscribers comprising the steps of:

creating transaction signals by the signaling network means in response to calls from wireless subscribers;

conveying said transaction signals to a message server means;

creating, processing and routing message signals by the message server means in response to said transaction signals, including:

selecting a subset of the service nodes of the network through execution of a node reduction algorithm in response to a request for service by a subscriber of the wireless subscribers, said subset of the service nodes being limited to only those service nodes of the network which serve the subscriber's logical telephone company area for services which the subscriber has subscribed to, said logical telephone company area not being defined in terms of a logical criterion that includes the subscriber's geographical area; and selecting at least one service node of the subset of the service nodes by performing arbitration and prioritization among nodes of the subset of service nodes in order to provide service responsive to the subscriber's request for service, said creating the message signals not being performed by a service node of the network;

connecting the at least one service node to the message server means in order for the at least one service node to provide said service responsive to the subscriber's request for service; and routing responses from said at least one service node to the signaling network to provide the service requested by the subscriber of the wireless subscribers, said method further comprising providing node interface means connecting the service nodes to the message server means, said node interface means assembling responses from applications provided by the service nodes, said node interface using said assembled responses to construct service lists for delivery to the message service means for performing said arbitration.

13. In a telephone system of the common channel signaling and control type having signaling network means for handling switching and control signals separate from voice signals, said signaling network means adapted to respond to and handle calls from wireless subscribers pertaining to requests for services, said signaling network means including means for providing transaction signals in response to calls to the telephone system by a wireless subscriber requesting service, said signaling network means further including message server means which includes:

means for creating message signals, which are compatible with the signaling network means and service nodes, in response to said transaction signals, said means for creating message signals not being comprised by a service node of the network;

message router means connected to said means for creating said message signals for routing said message signals to said service nodes;

means for selecting a subset of the service nodes of the network through execution of a node reduction algorithm in response to a request for service by a subscriber of the wireless subscribers, said subset of the service nodes being limited to only those service nodes of the network which serve the subscriber's logical telephone company area for services which the subscriber has subscribed to, said logical telephone company area not being defined in terms of a logical criterion that includes the subscriber's geographical area;

means for selecting at least one service node of the subset of the service nodes to process said message signals by performing arbitration and prioritization among the nodes of the subset of service nodes in order to provide service responsive to the subscriber's request for service; and node interface means for connecting the at least one service node to the message server means in order to provide service responsive to the subscriber's request for service, said node interface means adapted to assemble responses from applications provided by the service nodes, said node interface means further adapted to used said assembled responses to construct service lists for delivery to the message service means for performing said arbitration.

14. The telephone system according to claim 13, said message server means further comprising service node message handler means for connecting said message router means to said node interface means, said service node message handler means being coupled to a database of pending queries, said pending queries being associated with incoming transactions from said wireless subscribers, said database of pending queries being comprised by said message server means.

15. The telephone system according to claim 13, said message server means further comprising service node message handler means for connecting said message router means to said node interface means, said service node message handler means being coupled to a database of logged in nodes of the service nodes, said of database of logged in nodes being comprised by said message server means.

16. The telephone system according to claim 13, said node interface means comprising a list of logged in applications provided by the service nodes.

17. The telephone system according to claim 13, said node interface means comprising a transaction information manager at which transaction information is stored for later retrieval by an application of the selected at least one service node.

* * * * *

UNITED STATES PATENT AND TRADEMARK OFFICE
CERTIFICATE OF CORRECTION

PATENT NO. : 6,922,413 B1
DATED : July 26, 2005
INVENTOR(S) : Hume et al.

It is certified that error appears in the above-identified patent and that said Letters Patent is hereby corrected as shown below:

Title page,
Item [57], ABSTRACT,
Line 3, delete 'the minimizes" and insert -- that minimizes --.
Line 12, delete "subscribed in order" and insert -- subscriber in order --.

Column 4,
Line 1, delete "advanced intelligent / network" and insert -- advanced intelligent telephone network --.

Column 12,
Line 66, delete "message service" and insert -- message server --.

Column 14,
Line 13, delete "said of database of" and insert -- said data base of --.

Column 18,
Line 36, delete "to used said" and insert -- to use said --.
Line 53, delete "said of database of" and insert -- said database of --.

Signed and Sealed this

Twenty-fifth Day of October, 2005

JON W. DUDAS
*Director of the United States Patent and Trademark Office*